(12) United States Patent
Burgin et al.

(10) Patent No.: US 9,466,140 B2
(45) Date of Patent: Oct. 11, 2016

(54) SYSTEM AND METHOD FOR MAKING A MAP

(71) Applicant: eQuisition, LLC., Fulshear, TX (US)

(72) Inventors: James Norman Burgin, Fulshear, TX (US); Heather Womble, Katy, TX (US); Robert Gould, Austin, TX (US)

(*) Notice: Subject to any disclaimer, the term of this patent is extended or adjusted under 35 U.S.C. 154(b) by 61 days.

(21) Appl. No.: 14/058,188

(22) Filed: Oct. 18, 2013

(65) Prior Publication Data

US 2015/0109316 A1   Apr. 23, 2015

(51) Int. Cl.
| | | |
|---|---|---|
| G06T 11/60 | (2006.01) | |
| G06T 11/40 | (2006.01) | |
| G06Q 10/00 | (2012.01) | |
| G09B 29/00 | (2006.01) | |

(52) U.S. Cl.
CPC ............... G06T 11/60 (2013.01); G06Q 10/00 (2013.01); G06T 11/40 (2013.01); G09B 29/007 (2013.01)

(58) Field of Classification Search
CPC ...................................................... G06Q 10/063
See application file for complete search history.

(56) References Cited

U.S. PATENT DOCUMENTS

| | | | |
|---|---|---|---|
| 8,538,918 B1* | 9/2013 | Pearcy | G06Q 10/06 707/609 |
| 8,694,261 B1* | 4/2014 | Robinson | 702/14 |
| 2003/0220734 A1* | 11/2003 | Harrison | G06F 17/30241 701/409 |
| 2004/0138817 A1* | 7/2004 | Zoken | G01C 21/32 702/5 |
| 2005/0190079 A1* | 9/2005 | He | G01C 23/005 340/945 |
| 2006/0080131 A1* | 4/2006 | Martin | G06Q 50/16 705/1.1 |
| 2007/0050143 A1* | 3/2007 | Jones | G01C 15/00 702/5 |
| 2008/0133554 A1* | 6/2008 | Lee | G06F 17/30241 |
| 2009/0063424 A1* | 3/2009 | Iwamura | G06F 17/30241 |
| 2009/0125488 A1* | 5/2009 | Vala | G06F 17/30923 |
| 2009/0189901 A1* | 7/2009 | Steinthal | G06F 17/30241 345/441 |
| 2009/0216452 A1* | 8/2009 | Nance | G05B 15/02 702/5 |
| 2010/0106801 A1* | 4/2010 | Bliss | G06F 17/3087 709/219 |
| 2011/0066675 A1* | 3/2011 | Klawinski | G06F 17/30241 709/203 |
| 2011/0289008 A1* | 11/2011 | Landi | G06Q 30/0278 705/306 |
| 2012/0054270 A1* | 3/2012 | Foreman | G06Q 50/02 709/203 |
| 2012/0092326 A1* | 4/2012 | Borak | G06Q 30/0261 345/419 |
| 2014/0136286 A1* | 5/2014 | Hovis et al. | 705/7.34 |
| 2014/0142906 A1* | 5/2014 | Berezin | E21B 43/00 703/2 |
| 2015/0074002 A1* | 3/2015 | Johnson | G06Q 50/02 705/306 |

OTHER PUBLICATIONS

Proximity One, Geocoder, archived by Google on Feb. 21, 2013.*
Drilling Info, How to Load Custom Shape Files into DI Desktop, Oct. 9, 2012.*
Drilling Info, Step-by-Step Checklist for Searching Open Acreage, archived by Google on Oct. 7, 2011.*

* cited by examiner

*Primary Examiner* — Jacinta M Crawford
*Assistant Examiner* — Phong Nguyen
(74) *Attorney, Agent, or Firm* — Spradley PLLC; Michael Spradley

(57) ABSTRACT

A system and method for making a map is herein disclosed. In this embodiment, the method for making a map can comprise the steps storing in a map file within a data store a first set of shapes that together define a geographic region, and storing in the data store data related to a landmark at least partially within the geographic region. The shapes each comprising a unique track code. Additionally, the method further comprising the steps associating the landmark with each of the shape files comprising a relationship to the landmark and displaying on a map of the geographic region, visual representations of the attributes. The display viewable on a computer screen.

7 Claims, 19 Drawing Sheets

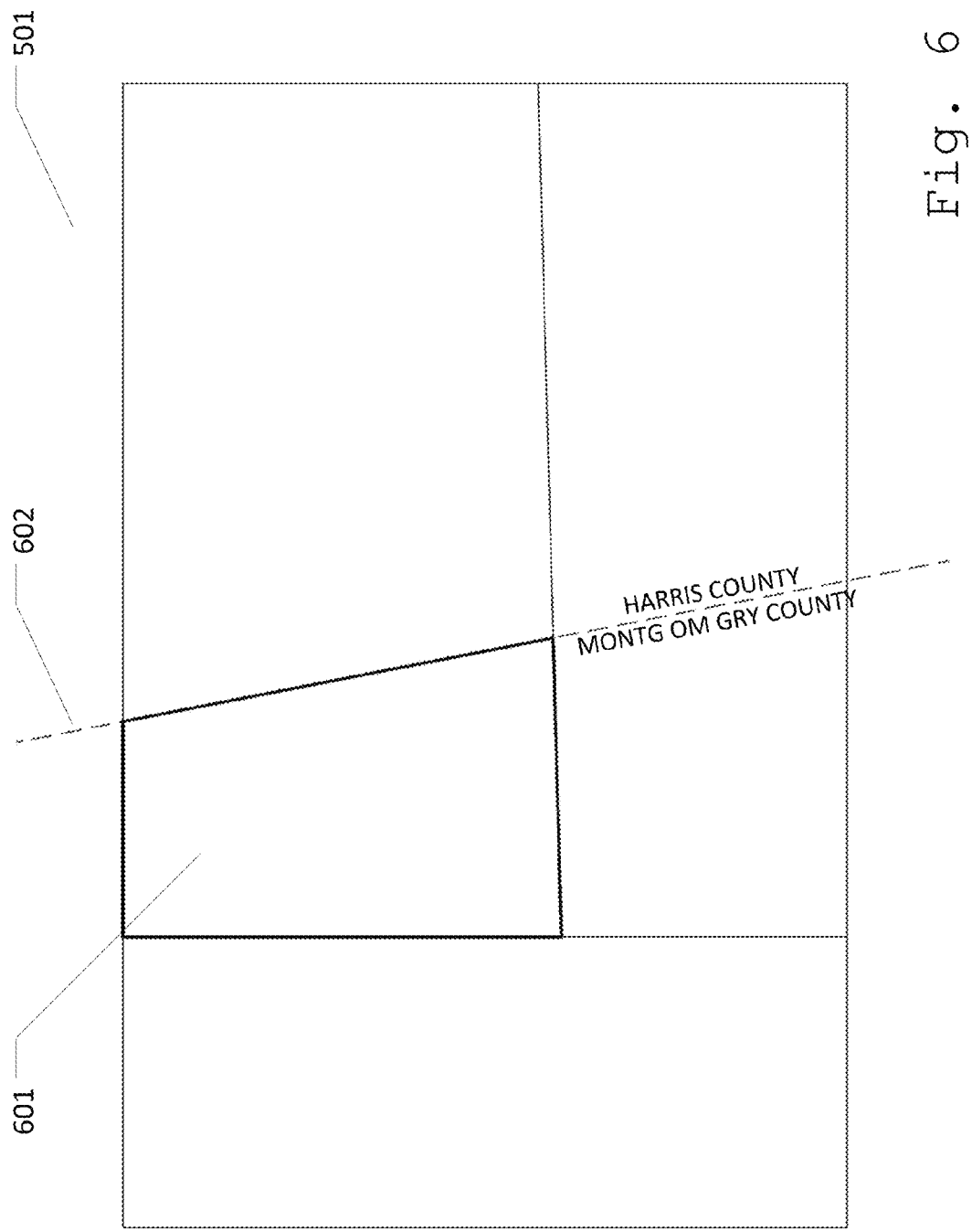

| County | Abstract | Tract | Owner | Percent | Lessee | Lease Percent | Lease Expiration | Offset (Ft) | Offset (Days) |
|---|---|---|---|---|---|---|---|---|---|
| 103 | S01 | 1 | Adams | 100% | Smith, Inc. | 0.88 | 12/31/2013 | 1500 | 30 |
| 103 | S01 | 2 | Barker | 100% | Smith, Inc. | 0.88 | 1/1/2015 | 1000 | 45 |
| 103 | S01 | 3 | Chang | 100% | Smith, Inc. | 0.88 | 6/1/2015 | | |
| 103 | S01 | 4 | Dunn | 100% | Smith, Inc. | 0.88 | 2/3/2017 | | |
| 103 | S03 | 5 | Egg | 100% | Smith, Inc. | 0.88 | 1/1/2015 | | |
| 103 | S03 | 6 | Fi | 100% | Smith, Inc. | 0.88 | 6/5/2018 | | |
| 103 | S03 | 7 | Garr | 100% | Smith, Inc. | 0.88 | 5/3/2015 | 2000 | 60 |
| 103 | S03 | 8 | Harper | 100% | Smith, Inc. | 0.88 | 4/2/2015 | 1000 | 90 |
| 103 | S01 | 9 | Irving | 100% | Smith, Inc. | 0.88 | 6/29/2016 | | |
| 103 | S01 | 10 | Jones | 100% | Barnaby, Inc. | 0.88 | 2/24/2016 | | |
| 103 | S01 | 11 | Korn | 100% | Barnaby, Inc. | 0.88 | 4/3/2015 | | |
| 103 | S01 | 12 | Lu | 100% | Smith, Inc. | 0.88 | 12/31/2015 | | |
| 103 | S01 | 13 | Mann | 100% | Barnaby, Inc. | 0.88 | 9/27/2015 | | |
| 103 | S04 | 14 | North | 100% | Smith, Inc. | 0.88 | 4/2/2016 | 1000 | 30 |
| 103 | S04 | 15 | Oliver | 100% | Barnaby, Inc. | 0.88 | 7/16/2015 | | |
| 103 | S04 | 16 | Pratt | 100% | Smith, Inc. | 0.88 | 12/15/2015 | | |
| 103 | S04 | 17 | Qi | 100% | Smith, Inc. | 0.88 | 2/28/2015 | | |
| 103 | S04 | 18 | Rogers | 100% | Smith, Inc. | 0.88 | 3/1/2015 | | |
| 103 | S04 | 19 | Singer | 100% | Smith, Inc. | 0.88 | 4/2/2017 | | |
| 103 | S04 | 20 | Tan | 100% | Smith, Inc. | 0.88 | 5/15/2015 | 1000 | 45 |
| 103 | S04 | 21 | Turner | 100% | Smith, Inc. | 0.88 | 12/12/2015 | 1200 | 90 |
| 103 | S02 | 22 | Ulysses | 100% | Smith, Inc. | 0.88 | 6/6/2016 | | |
| 103 | S05 | 23 | Vernon | 100% | Smith, Inc. | 0.88 | 12/15/2017 | | |
| 103 | S05 | 24 | Wagner | 100% | Smith, Inc. | 0.88 | 11/21/2016 | | |
| 103 | S07 | 25 | Xi | 100% | Barnaby, Inc. | 0.88 | 12/25/2018 | | |
| 103 | S06 | 26 | York | 100% | | | | | |
| 103 | S06 | 27 | Zoro | 100% | | | | | |

Fig. 7 https://ibabeta.equisition.com

● Dashboard  ⬡ Acquisition  ⊕ Timesheets  ✏ Admin  ♟ Preferences ☐ Notepad ❷ Help 🔒 Log Out Home : Acquisitions: Maintenance ↩ Return to Grid ⊕ New Tract ⊖ Delete Tract ☐ View Totals

| Polygon | Ownership | Leases | Instruments | Documents |

Prospect: [Demo 1 ▾]
Prospect: [None ▾]
State/Province: [Texas ▾]
County: [Houston]
Abstract number: [ ]
Tract number: [ ]
Client Tract number: [ ]
Acreage: [ ]
Rods: [ ]
Survey: [ ]
Title Agent: [Gould,Robert ▾]
Runsheet Status: [Select One ▾]
Leasing status: [No ▾]
Status Overridden:

Legal Description:
[                    ]

Runsheet Description:
[                    ]

[Save changes]  [Cancel changes]

| Location | Type | Owner | Establishment Date |
|---|---|---|---|
| 140.12,23.21 | Drilling Rig | Barnaby, LLC | 10/15/13 |

Fig. 17B

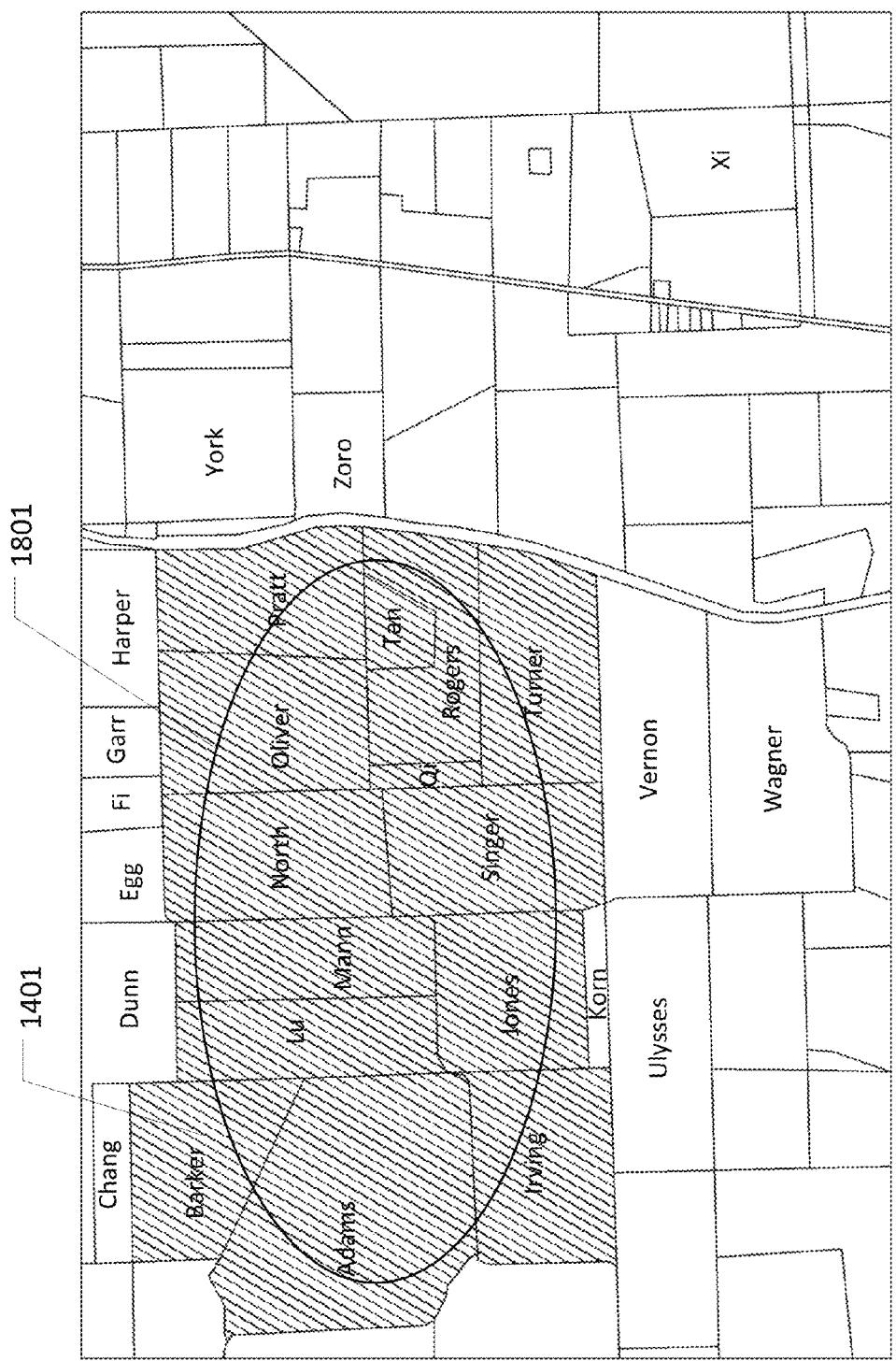

Fig. 19

| County | Abstract | Tract | Owner | Percent | Lessor | Lease Percent | Lease Expiration | Offset (Ft) | Offset (Days) |
|---|---|---|---|---|---|---|---|---|---|
| 103 | 501 | 1 | Adams | 50% | Smith, Inc. | 0.88 | 12/31/2013 | 500 | 80 |
| 103 | 501 | 1 | Azark | 20% | Barnaby, Inc. | 0.88 | 11/12/2013 | | |
| 103 | 501 | 1 | Aaron | 10% | | | | | |
| 103 | 501 | 1 | Austin | 10% | | | | | |
| 103 | 501 | 1 | Anderson | 10% | Smith, Inc. | 0.88 | 6/5/2018 | 1000 | 90 |

SYSTEM AND METHOD FOR MAKING A MAP

BACKGROUND

This disclosure relates to a system and method for making a map. Such discussion of making a map is solely exemplary, and not limiting.

Methods for keeping tract of land title information and tract index information have evolved over the years. Previous methods for displaying lease provisions included taking a spreadsheet of data and hand-drawing tracts, as well as possibly numbering them. Then, a title history search needed to be conducted on each individual tract to determine ownership percentages. Since such processes cost time and money, accounting for resources spent per tract has been necessary as well. Costs for negotiating and contracting with leaseholders represented on hand-drawn tracts also need to be taken into account.

Additionally, previous methods have included compiling all information regarding title, and leases in multitudes of document formats, such as .pdf, .rtf, .xls and .doc files. In the context of oil and gas title research, as various inputs from landmen in different geographical locations submit title history and lease information, their data is submitted in various formats and contain variances and inconsistencies in the data itself due to the difference of each Counties methods of recordation. Each tract in a given contract or lease can be labeled or numbered and inputted into a database. Once inputted, each individual tract requires a title search to determine ownership and title issues. Once determined, reports are written for each tract. This requires much time and expense to process.

Contracting with lessors requires accounting for various tracts of land, boundaries, mineral and surface rights, as well as terms for drilling and various deadlines. Similarly, mortgages and homeownership, legal obligations, title and property issues (easements, covenants) must be accounted for based on property location. Determining lease terms, contract expirations, lessor rights, and offset provisions, for example, requires searching through title information in databases. Presently, title research, along with the production of title opinions and curing defects can take several months, or even years. Due to overlapping title areas of interest or tracts, and the lack of previously prepared data, there is often duplication of efforts and inefficient allocation of resources.

However, such current methods are incapable of accommodating a uniform, centralized account of all information for a given geographic location in a timely or real time basis. Knowledge of contract provisions and rights of other private entities not previously or currently contracted with are also lacking, and litigation can result in the lack of coordination of information. In addition to the time needed to collect raw data, significant amounts of time are also spent in analyzing and manipulating information, such as ownership information, related contracts, and other burdens and appurtenances related to the track. As a result, deadlines are often under risk and lease or contract provisions might inadvertently be violated. Furthermore, such information is constantly changing, and needs to be perpetually updated for efficient decision-making. Finally, the vast amount of data that needs to managed is too diverse and complex to organize merely in columns and rows of spreadsheets. The current system of assimilation and manipulation of data from multiple data sources could not be made in a timely manner or without inordinate allocation of resources.

As such it would be useful to have a system and method for making a map.

SUMMARY

A system and method for making a map is herein disclosed. In this embodiment, the method for making a map can comprise the steps storing in a map file within a data store a first set of shapes that together define a geographic region, and storing in the data store data related to a landmark at least partially within the geographic region. The shapes each comprising a unique track code. Additionally, the method further comprising the steps associating the landmark with each of the shape files comprising a relationship to the landmark and displaying on a map of the geographic region, visual representations of the attributes. The display viewable on a computer screen.

In another embodiment, a system for making a map is herein disclosed. The system for making a map can comprise a memory, and a processor. The memory comprising an application and a database. The processor that according to instructions of the application stores in a database a first set of shapes that together define a geographic region, and stores in the database data related to a landmark at least partially within the geographic region. The shape files each comprising a unique track code. Additionally, according to the instructions of the application on the processor, associates the landmark with each of the shape files comprising a relationship to the landmark and displays on a map of the geographic region, visual representations of the attributes. The display viewable on a computer screen.

Lastly, a non-transitory computer-readable storage medium comprising a computer readable program code embodied therein, wherein the computer readable program code is adapted to be executed to implement the above mentioned method.

BRIEF DESCRIPTION OF THE DRAWINGS

FIG. 6 illustrates map template adjustment.
FIG. 7 illustrates an attribute table.
FIG. 8 illustrates a database management console capable of creating, editing, and/or deleting entries in an attribute data.
FIG. 11 illustrates ownership tab with a lease creation button next to an owner.
FIG. 12 illustrates a lease creation form.
FIG. 17B illustrates attribute data comprising to landmark data.

FIG. 18 illustrates attribute map related to the location of a mineral formation.

FIG. 19 illustrates a portion of attribute table related to polygon comprising multiple owners.

DETAILED DESCRIPTION

Described herein is a system and method for making a map. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
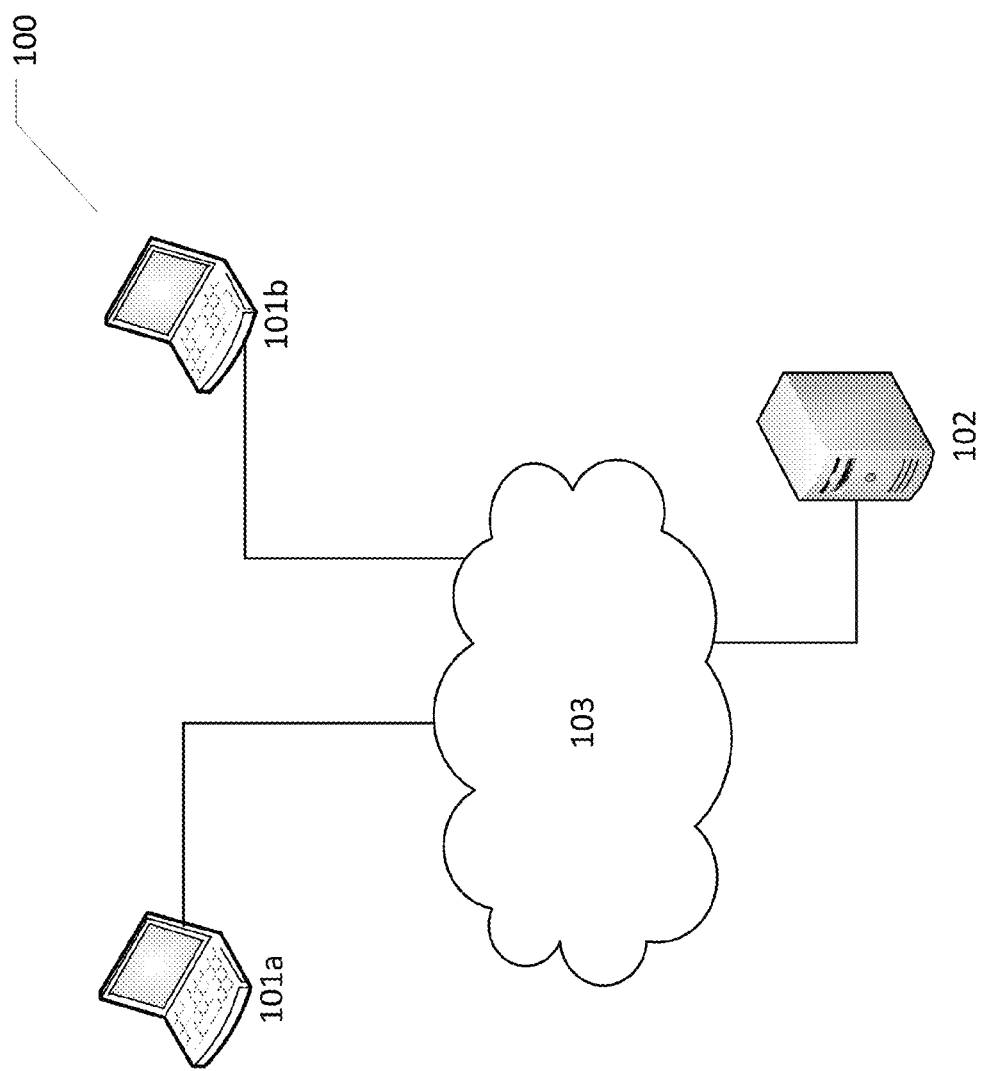
FIG. 1 illustrates a mapping system.

FIG. 1 illustrates a mapping system 100. Mapping system 100 can comprise computers 101, server 102, and a network 103. Computers 101 can include, but are not limited to, desktops, laptops tablets, and/or mobile devices. Computer 101 can receive and transfer data to network 103. Computer 101 can include, but is not limited to, an office land man computer 101a or a field land man computer 101b. Network 103 can share data with server 102. Server 102 can store, receive and perform logic on data from network 103 and/or computer 101 in mapping system 100.

Figure 2:
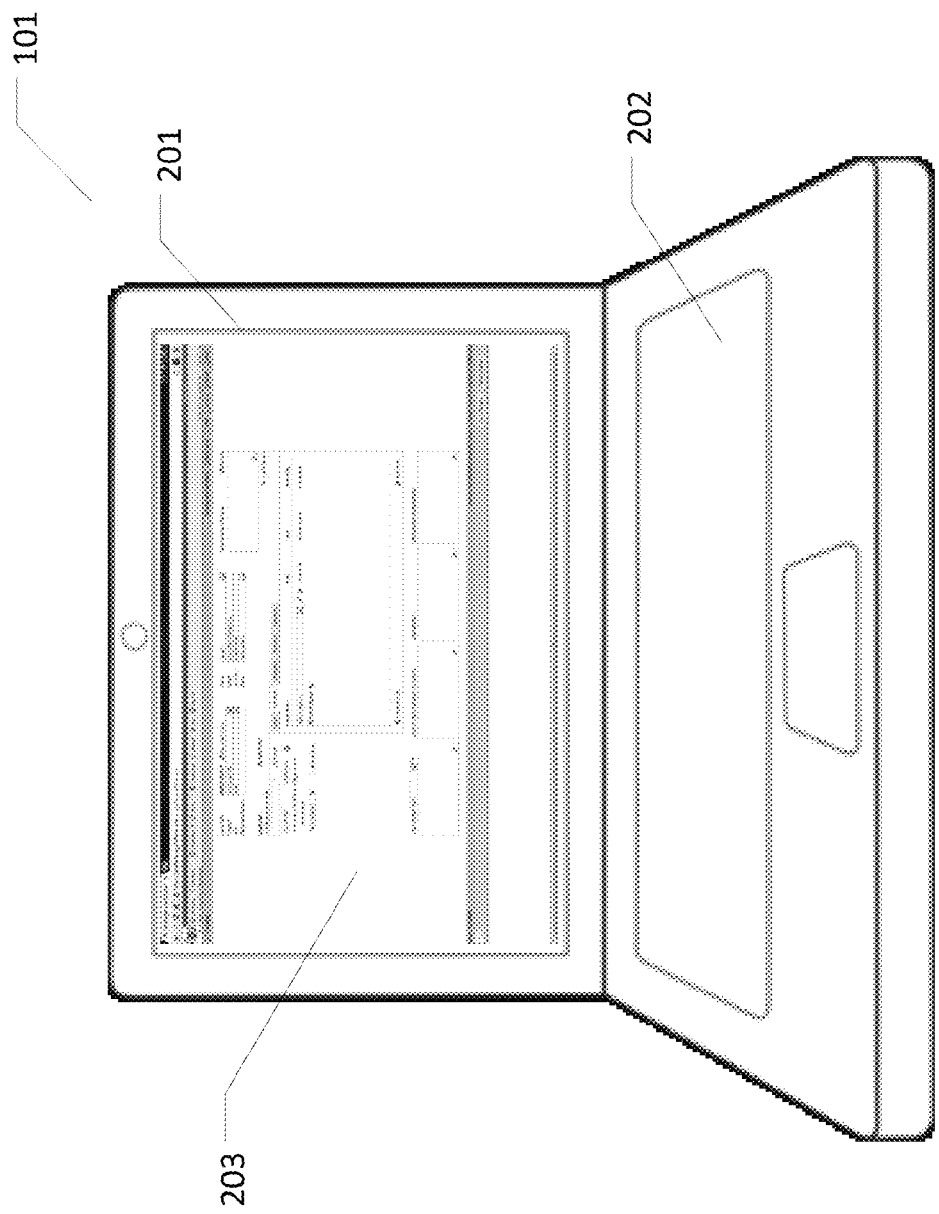
FIG. 2 illustrates a computer.

FIG. 2 illustrates an embodiment of computer 101. Computer 101 can include, but is not limited to, a screen 201, and a keyboard 202. Other input devices can include tract balls, joy sticks, or scroll wheels. Screen 201 can be a mere display output, or can also be a touch screen, allowing for capturing of input data 203. Data 203 to be inputted can include tract information, address, and/or title information, lessor information, which will be discussed further. Data 203 can also include images of maps, ownership information, lease information and/or other information, which will also be discussed further.

Inputting data 203 can prompt storing of data 203 to server 102. In another embodiment, inputting data 203 can also prompt search inquiry of data 203 already stored in server 102 and/or computer 100. In another embodiment, inputting data 203 can prompt altering of data 203 already stored to server 102 and/or network 103. Keyboard 202 can comprise a plurality of physical buttons on computer 101, however in an embodiment were screen 201 is a touch screen, keypad 202 can be represented virtually on screen 201.

Figure 3:
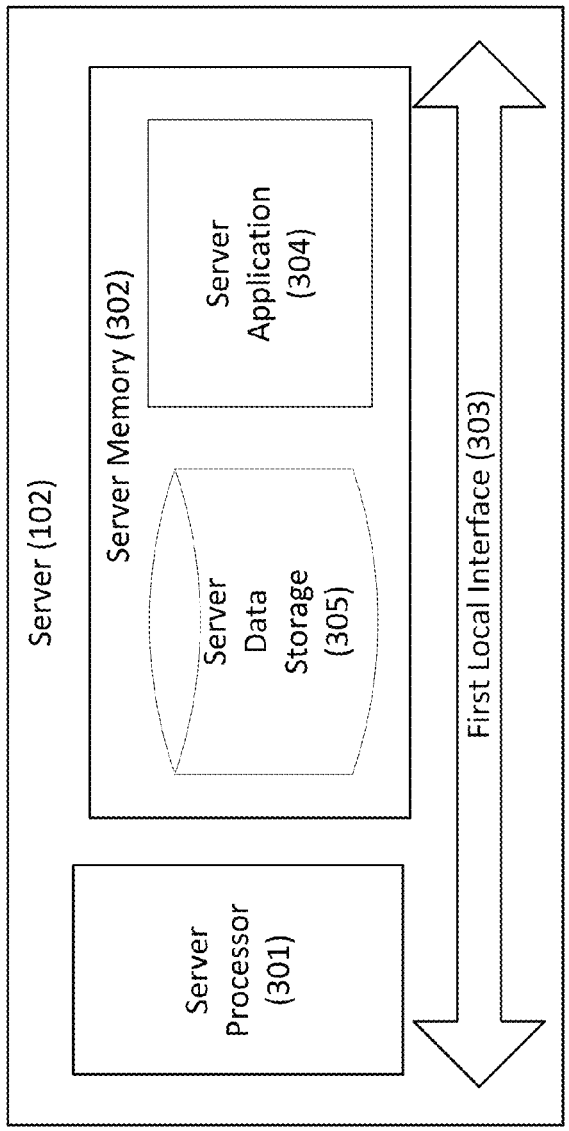
FIG. 3 illustrates server hardware.

FIG. 3 illustrates a schematic block diagram of server 102 according to an embodiment of the present disclosure. Server 102 includes at least one processor circuit, for example, having a processor 301 and a memory 302, both of which are coupled to a local interface 303. To this end, the server 102 can comprise, for example, at least one server, computer or like device. Local interface can comprise, for example, a data bus with an accompanying address/control bus or other bus structure as can be appreciated.

Stored in memory 302 described herein above are both data and several components that are executable by processor 301. In particular, stored in the memory 302 and executable by processor 301, is a server application 304. For purposes of this disclosure, server application 304 can be one or many applications. Also stored in memory 302 can be a data store 305 and other data. In addition, an operating system can be stored in memory 302 and executable by processor 301, and other applications.

Figure 4:
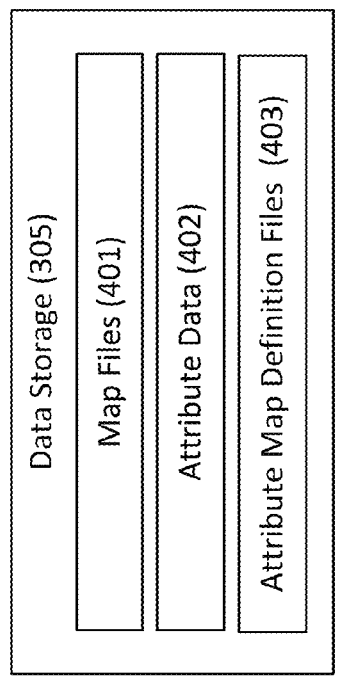
FIG. 4 illustrates a data store

FIG. 4 illustrates data store 305. Data store 305 can comprise one or more map files 401, attribute data 402, and attribute map definition file 403. Server application 304 can read map file 401 and attribute data 402 in the course of its execution by processor 301. Attribute map definition file specifies one or more map files 401, along with particular data sets from attribute data 402 for the creation of an attribute map, as discussed further below.

Figure 5:
FIG. 5 illustrates a shape map represented by a map file.

FIG. 5 illustrates a shape map 501 represented by map file 401. Shape map 501 can be displayable on screen 201. Map file 401 scan be created by a mapping software application before being stored in data store 305. One example of map file 401 is a spatial database engine file ("SDE file") created by ArcSDE. Another example is a shape file. Map 501 comprises a plurality of shapes 402 represented in map file 401, each shape represented by spatial data. For purposes of this disclosure, shapes 502 can include, but are not limited to, polygons, lines, etc., and can each be an SDE layer.

FIG. 6 illustrates abstract 601 divided into tracts 602. Shape map 501 comprises a plurality of abstracts 601 divided into one or more tracts 602. Tracts 602 can lie in one county or cross county boundaries or even state boundaries. Abstracts 601 and tracts 602 can relate to historical land grants. However, over time, abstracts 601 and tracts 602 could have been further sub-divided into smaller plots. One type of shape 502 is a polygon 603. For purpose of this disclosure, polygon 603 can be any closed form shape 502 and is not restricted to the strict mathematical definition of a polygon. For example, within this disclosure, polygon 603 can have one or more curved sides. Each tract 602 can be divided into one or more polygons 603.

FIG. 7 illustrates an attribute table 700. An attribute 701 is any piece of information or data that can be associated with one or more polygons 603. Polygon 603 can each represent the largest contiguous area having the same attributes 701. Each polygon 603 can have a unique identifier to associate attributes 701 with polygon 603. In one embodiment, one or more attributes 701 can be combined to form unique identifier. Attributes 701 can include, but are not limited to, state, county, abstract, tract, land and/or mineral owner name, property address, lease status, lease expiration, lessor, lessee, and/or lease date, offset provision, offset provision status, geographic relationship to a particular shape 502, and/or geographic relationship to a particular landmark. In FIG. 6, tract 602 passes through a county line. Therefore attributes 701 of a first portion of tract 602 are different from a second portion. In this example, the difference is county. One type of unique identifier is a tract code. A tract code can an alphanumeric combination comprising references to county, abstract and track. As shown in FIG. 6, second portion of tract would have a different tract code because it lies in a different county. As such, first portion would be enclosed in polygon 603a, and second portion would be enclosed in polygon 603b.

FIG. 8 illustrates a database management console 800 capable of creating, editing, and/or deleting entries in attribute data 402. In one embodiment, data management console 800 can comprise a plurality of tabs relating to attribute data 402. In FIG. 8, a polygon tab 801 is chosen. Polygon tab 801 allows a user to key in a tract code or other unique identifier to link attribute data 402 with a particular polygon 603 in map file 401. Al tabs in data management console 800 relate to the same polygon.

Figure 9:
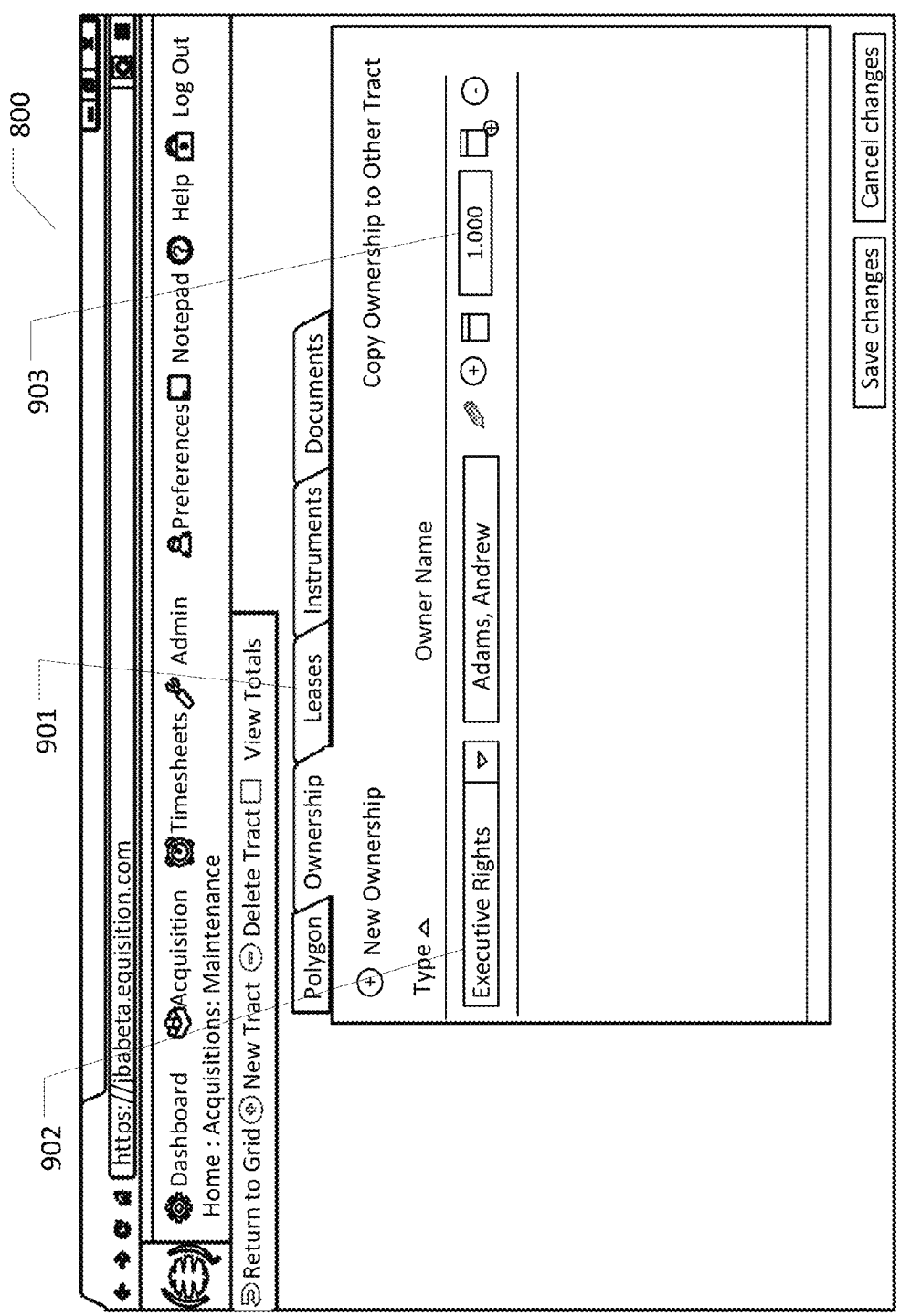
FIG. 9 illustrates a data management console with an ownership tab that is open.

FIG. 9 illustrates data management console 800 with an ownership tab 901 that is open. Within ownership tab 901, a user can enter attribute data 402 related to polygon. Polygon 402 can have one owner, as shown in FIG. 9, or can have a plurality of owners, as will be discussed further. Within ownership tab, an ownership type 902 can be established as well as an owner name 903 and a percentage ownership 903.

Figure 10:
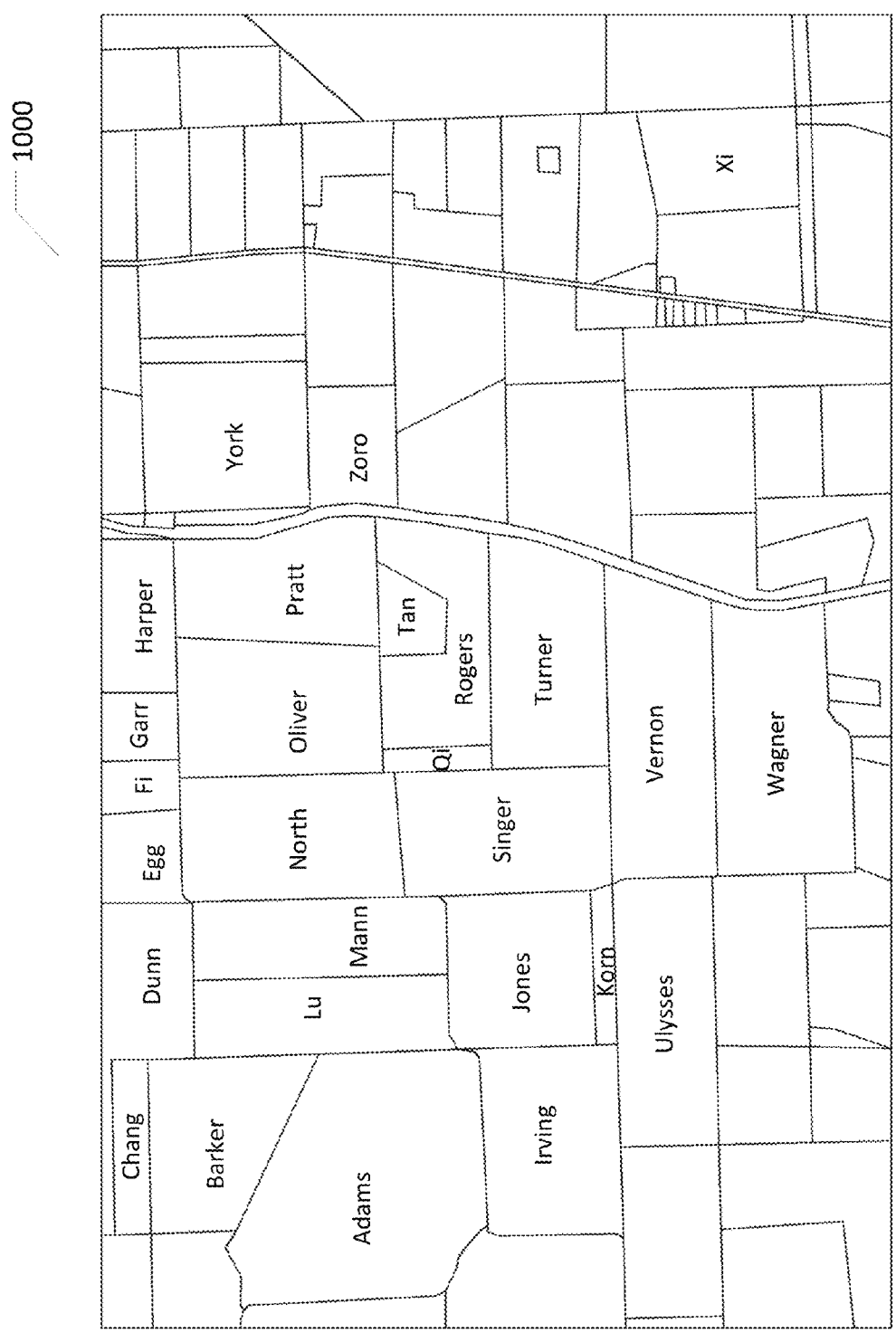
FIG. 10 illustrates an attribute map relating to ownership.

FIG. 10 illustrates an attribute map 1000 relating to ownership. Using map file 401 and attribute data 402 referenced within attribute map definition file 403, server application 304 can create attribute map 1000 that displays the owner of each polygon 603, or group of polygons 603 (such tracts.)

Figure 11:
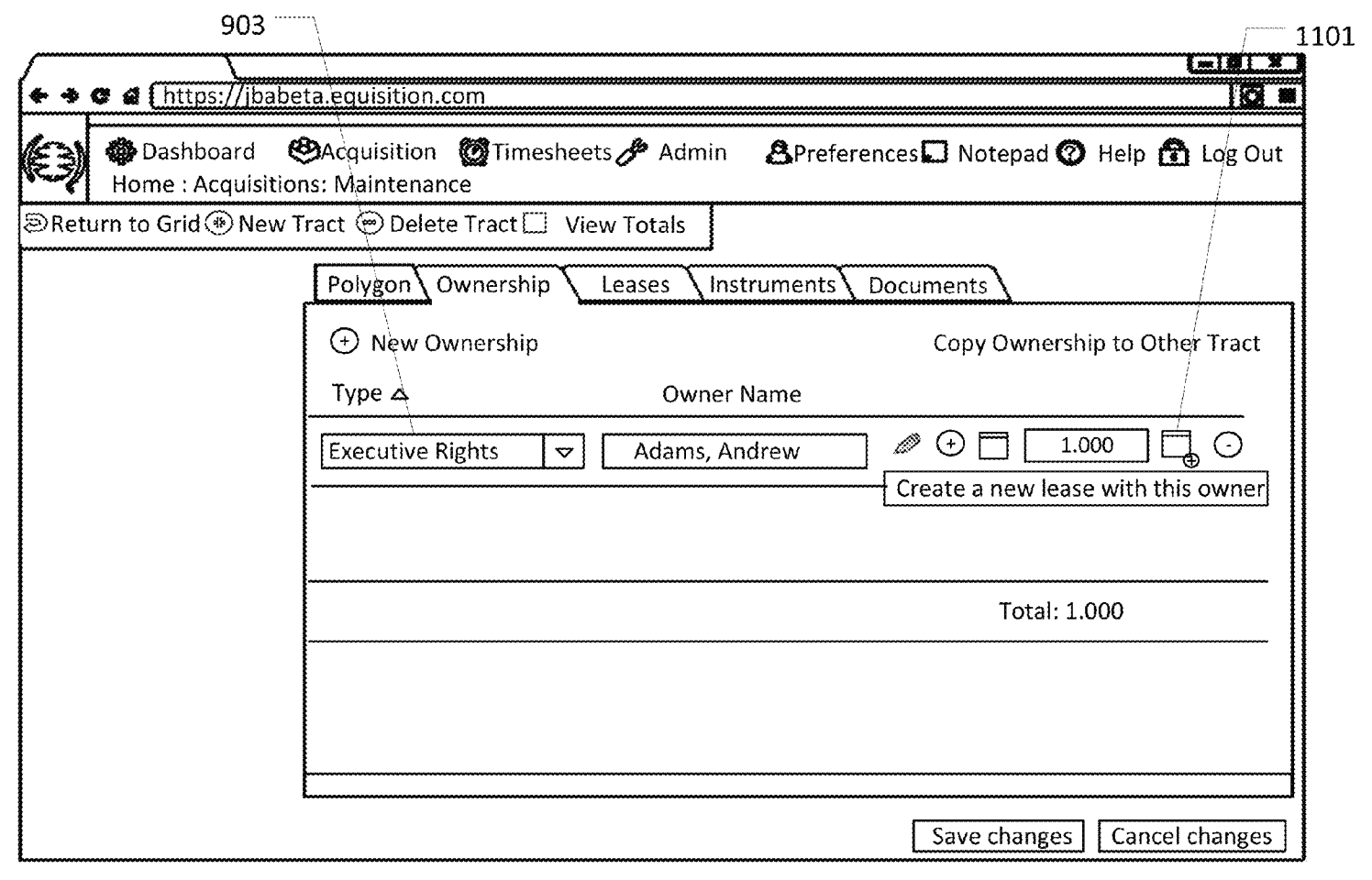

FIG. 11 illustrates ownership tab 903 with a first lease creation button 1101 next to an owner. As a non-limiting example, when minerals are found in a geographic area, many companies send land men to the area to attempt to lease the minerals from property owners. By accessing server application 304 using computer 101, a land man can easily add a lease to data store 305. In one embodiment, each listed owner on ownership tab 903 can have its own first lease creation button 1101.

Figure 12:
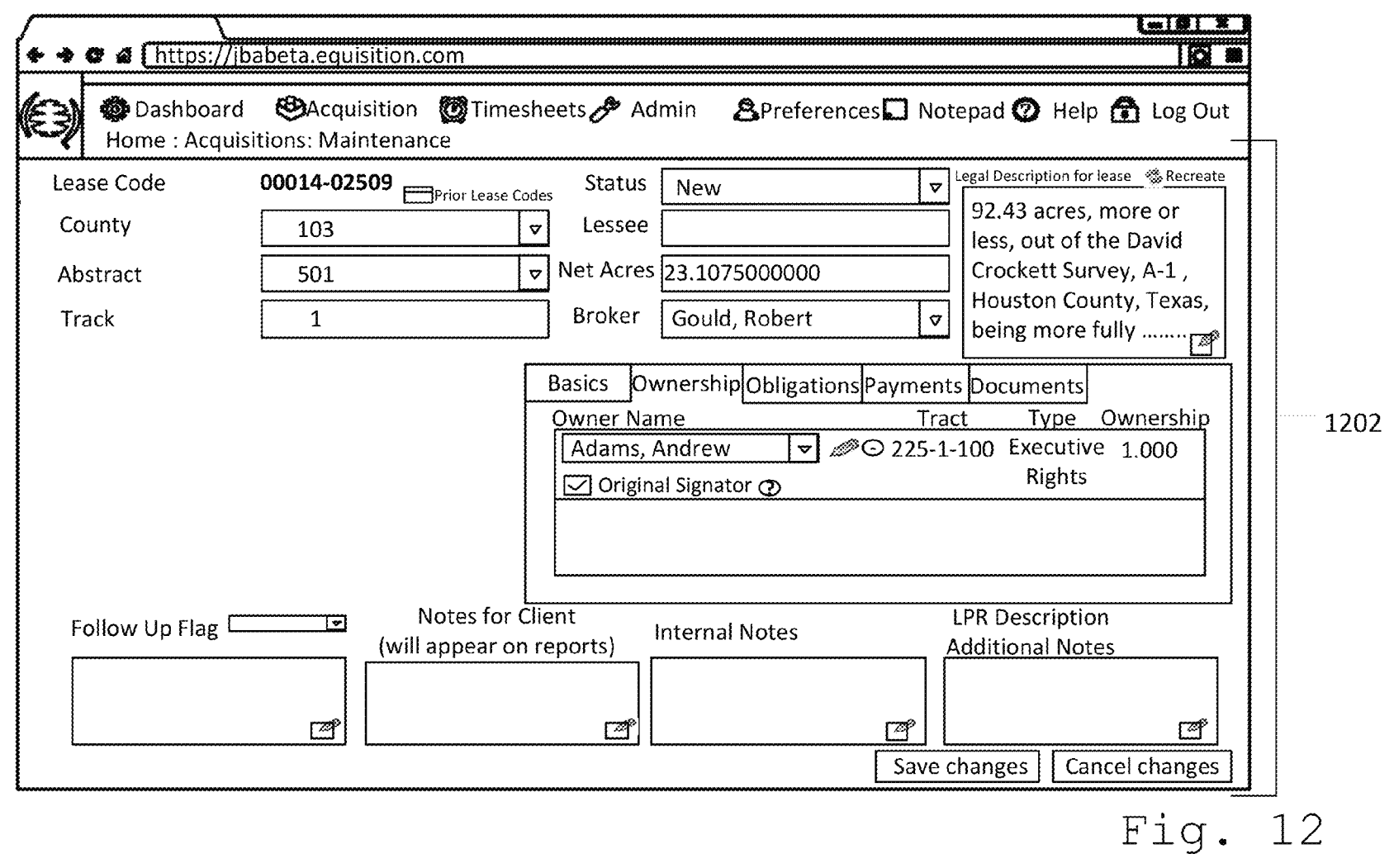

FIG. 12 illustrates a lease creation form 1202. By clicking lease creation button 1101, lease creation form 1202 can be displayed. Lease creation form 1202 can collect information related to a lease such as, but not limited to, lessor, lessee, tract code, address, offset provisions, and/or lease expiration. Portions of lease creation form 1202 can be automatically filled out. For example, the Lessor information can be filled out with the owner's information that is next to the first lease creation button 1101. Additionally, tract information can be placed into lease creation form. Once lease creation form 1202 is filled out and submitted, such lease information can be added to attribute data 402. Once in attribute data 402, lease information can be referenced by one of attribute map definition files 403. Such file can be used by server application 304 to create attribute map 800 related to leased property, for display on screen 201.

Figure 13:
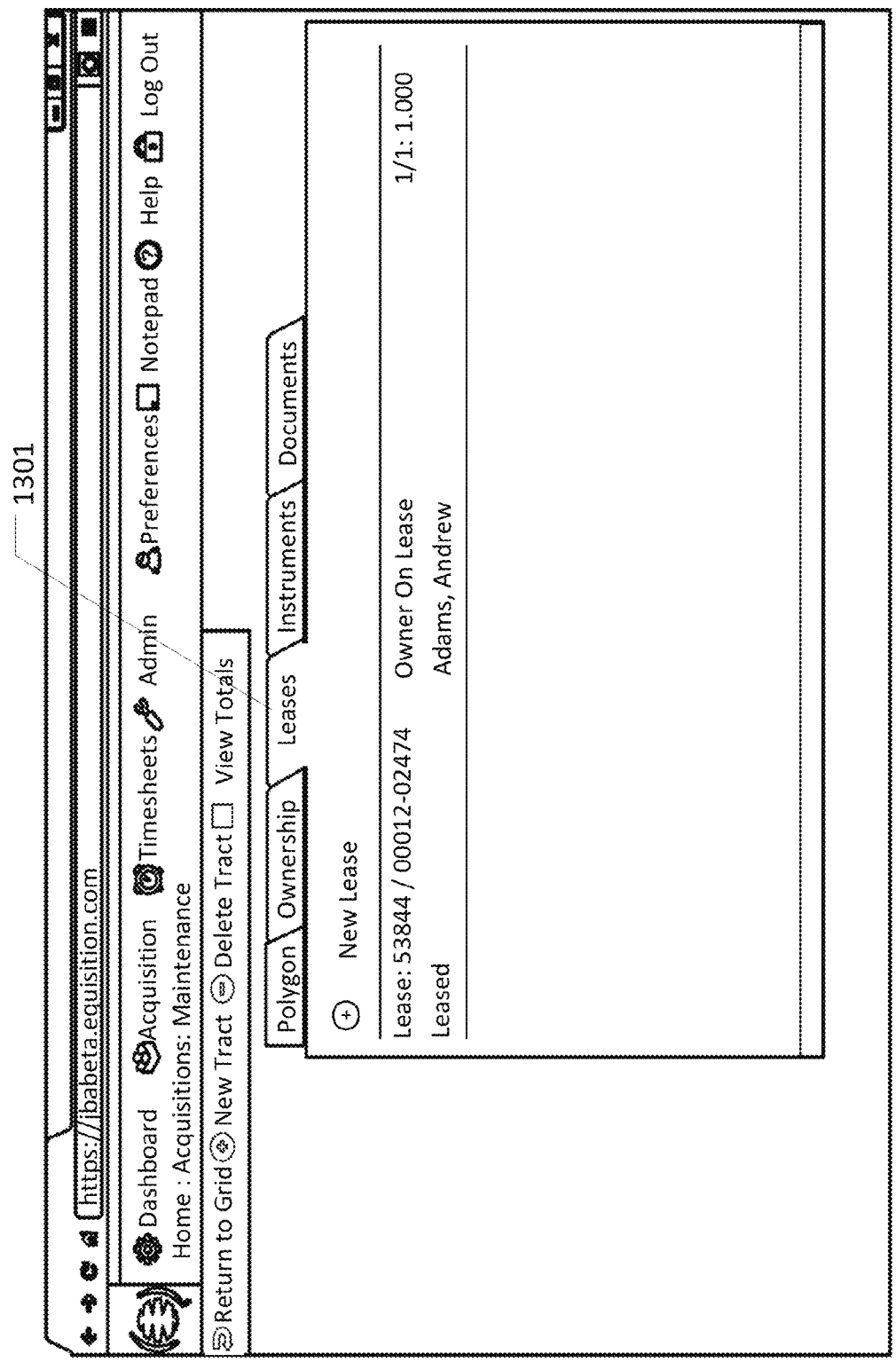
FIG. 13 illustrates an open lease tab.

FIG. 13 illustrates an open lease tab. By clicking on and therefore opening lease tab, user is able to view recorded leases in attribute data 402. In lease tab, user can also, in one embodiment, record a new lease by clicking on a second lease creation button 1301. Similar to first lease creation button 1101, second lease creation button 1301 can also open lease creation form 1202. Once open, a user can enter lease information including, but not limited to, lessor, lessee, lease expiration, and offset provisions. In one embodiment, server application 304 can verify that lessor is one of a listed owners related to polygon 603 for which user is attempting to attach a lease. If lessor does not match an owner, then server can reject the lease. If lessor does match an owner, server application 304 can allow lease to be included as an attribute of polygon 603. Lease can also be associated with the owner that matches lessor. In one embodiment, lease creation form can utilize a pull down menu comprising attribute elements related to polygon 603 from the ownership column of attribute data 402. By doing so, no lease can be created an entered into attribute data 403 that is not validly connected to an owner of polygon 603.

Figure 14:
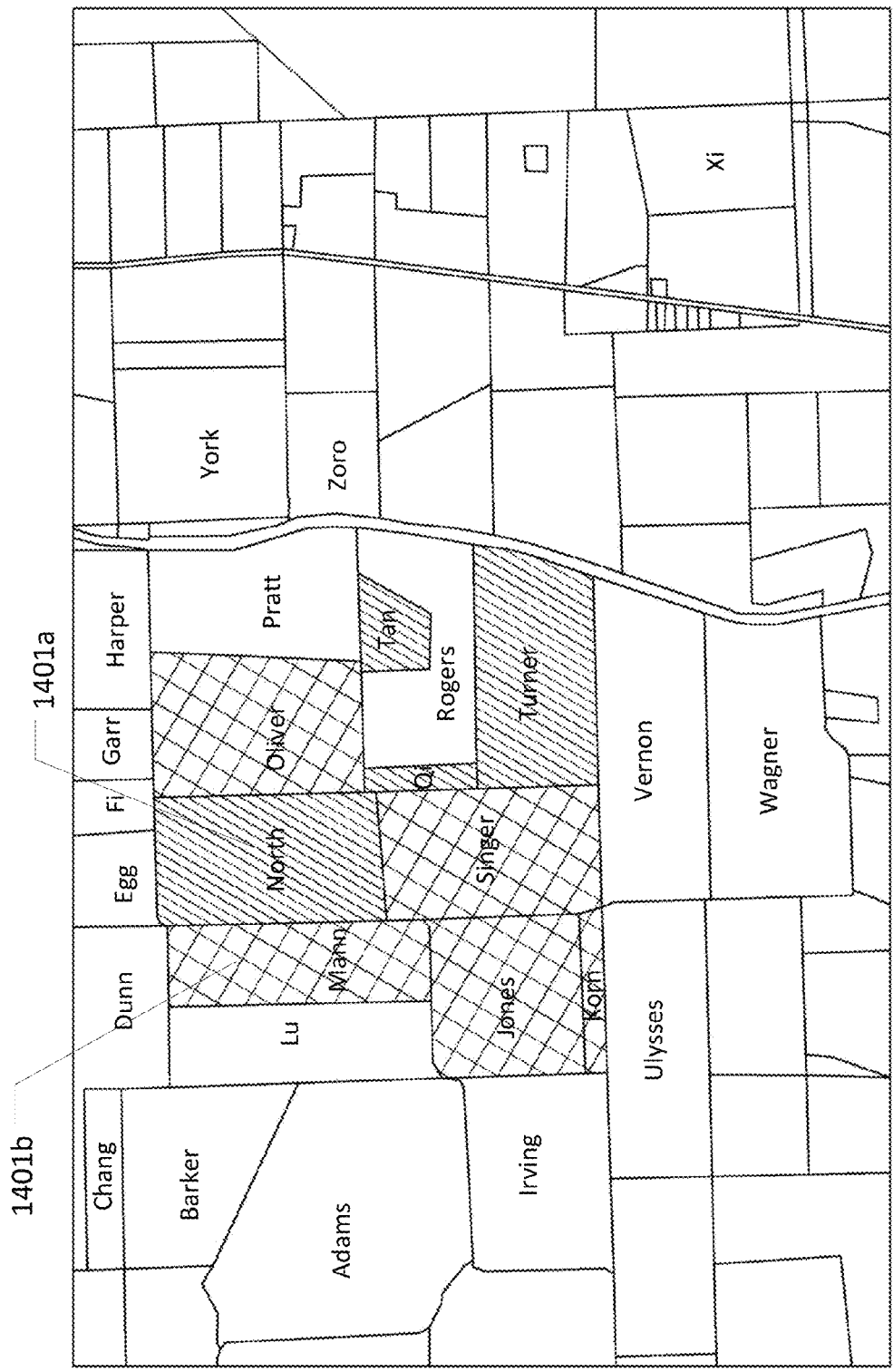
FIG. 14 illustrates attribute map relating to leased property.

FIG. 14 illustrates attribute map 800 relating to leased property. Attribute map 800 displays areas that are leased by a first company and a second company. Shapes 402 leased by first entity or entities can be represented by a first visual representation 1401a. Shapes 402 leased by a second entity or entities can by a second visual representation 1401b. There can be as many different visual representations 1401 as is necessary to distinguish entities. For example, if five entities are leasing in the area, attribute map can comprise five unique visual representations 1401. Visual representations 1401 can include colors, hatching, borderline variations, and can be static representations, or representations such as flashing indicators. As land men enter new leasing information into attribute data 402, server application can transmit updated attribute data 402 to computers 101 transitory displaying attribute map 800. In such system, a land man can clearly see work being performed in the geographic area. Such system can benefit its user by allowing it to choose where it should expend human resources, i.e., land men to secure new leases.

Figure 15:
FIG. 15 illustrates changes to attribute map related to leased property.

FIG. 15 illustrates changes to attribute map 800 related to leased property. Armed with the knowledge in attribute map 800 of FIG. 14, land men can target leases most beneficial to its company. As shown in FIG. 14, the first company is able to lease properties all around the leases of the second property, effectively blocking off the second company from having contiguous leased area.

Figure 16:
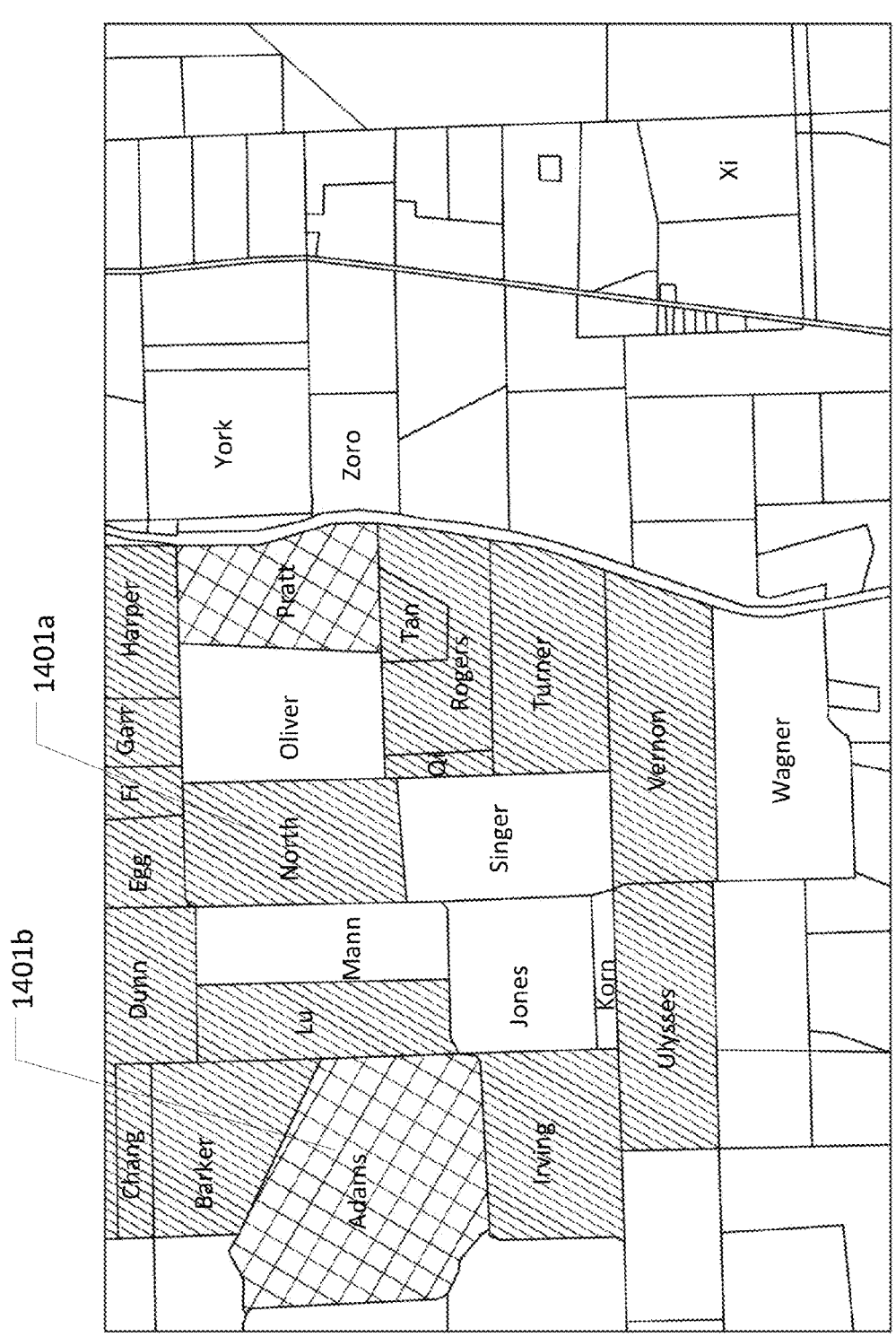
FIG. 16 illustrates attribute map relating to lease expirations.

FIG. 16 illustrates attribute map 800 relating to lease expirations. Some mineral leases have expiration dates. For example, if a lessor fails to perform some action within a certain period of time such as drilling a well on the property, rights to the minerals reverts back to the property owner. For a company dealing with multiple leases, keeping up with mineral right reversions (lease expirations) can be time consuming and difficult to ascertain which lease expirations are important and which are not. Attribute map 800 in FIG. 15 can displays polygons 603 having varying visual representations 1401 depending on whether a lease expiration related to polygon 603 outside or within a predefined threshold measured from the present date. For example, if a lease for polygon 603 is not set to expire within 90 days, polygon 603 can comprise first visual representation 1401a. If a lease for polygon 603 is set to expire within 90 days, polygon 603 can comprise second visual representation 1401b. In one embodiments, shapes can be separated by lease expiration dates using multiple predefined thresholds. For example, lease expirations can be separated by quarters. Polygons 603 having a lease expiration in this quarter can comprise first visual representation 1401a. Polygons 603 having a lease expiration in the next quarter can have second visual representation 1401b. Polygons 603 expiring in the next quarter can have a third, and so on. In such embodiment, leases having no lease expiration or a very distant (outside the bounds of all predetermined thresholds) expiration can have a different visual representation. In another embodiment, thresholds can be supplied by a user.

Figure 17A:
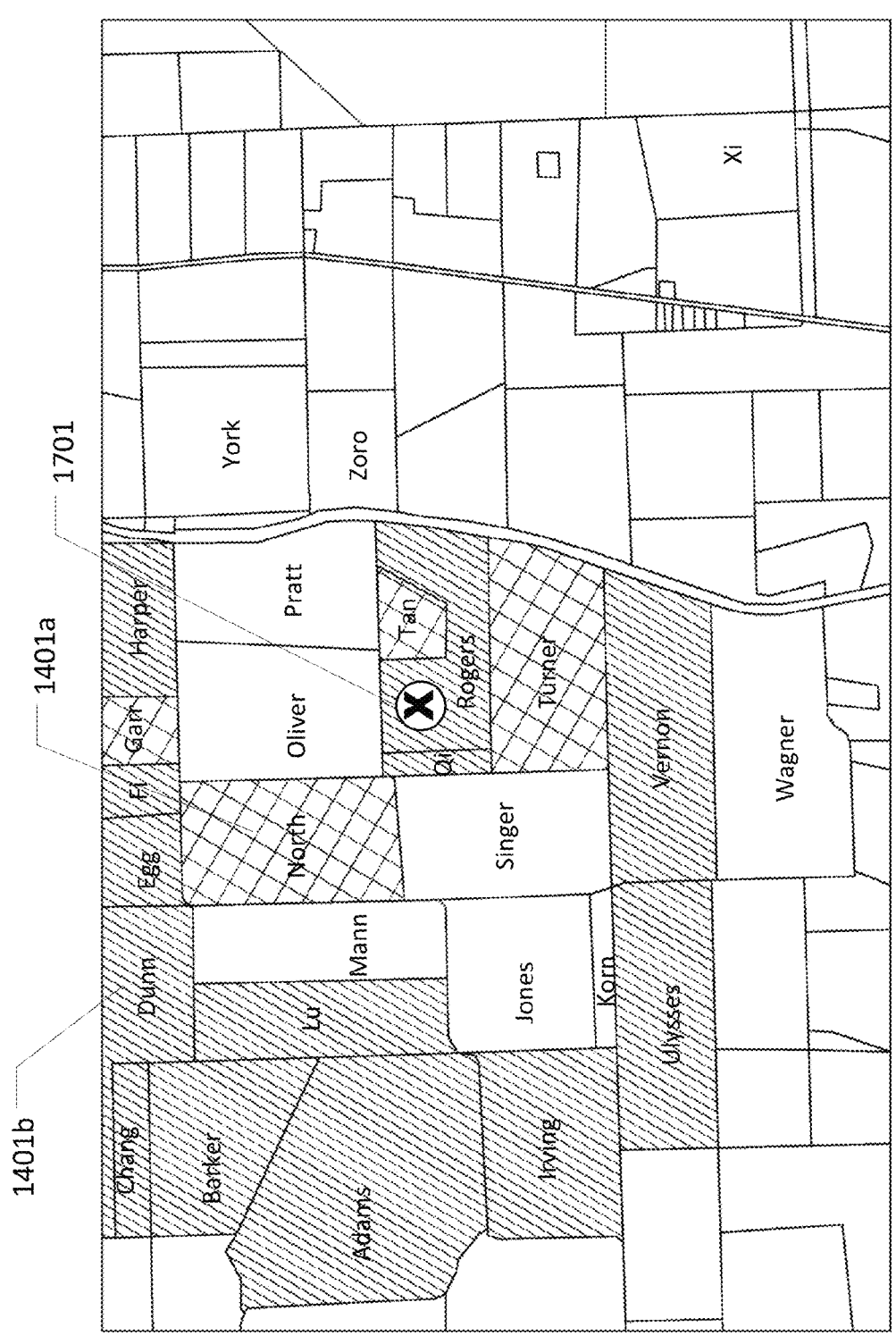
FIG. 17A illustrates attribute map related to lease offset provisions.

FIG. 17A illustrates attribute map 800 related to lease offset provisions. One type of shape 502 can be a landmark 1701. In one embodiment, landmark 1701 can be included in map file 401. In another embodiment, landmark 1701 can be stored separately in a landmark file 404. A landmark file is a special shape file that includes one or more landmarks 1701 along with a geographic reference set that allows it to be positioned with reference to map file 402. In one embodiment, attribute data can comprise data related to landmarks 1701. In another embodiment, such data can be kept in a separate landmark attribute data within data store 305.

FIG. 17B illustrates attribute data related to landmark 1701. Data relate to landmark 1701 can include, but is not limited to, landmark type and landmark establishment date. Server application 304 can, using map files and/or landmark file, determine geographic relationships between polygons 603 and landmarks. Examples of geographic relationships can include an overlap, lack of overlap, or a separation distance.

One example of a landmark type is a mineral extraction point such as an oil well. An offset provision requires a lessor create a mineral extraction point on the leased within a predetermined period of time if another mineral extraction point is established within a predetermined distance from the property. Attribute map 800 of FIG. 17 displays landmark 1701 within the property owned by Rogers. Server application 304 can determine the geographic relation between each polygon 603 having and offset provision and the mineral extraction point. Server application 304 can then compare the distance to an offset provision distance. Polygons 603 having an offset provision and having a geographic relationship to mineral extraction point within its offset provision can be represented on attribute map 800 with first visual representation 1401a. Other polygons 603 not having such relationship can be represented on attribute map 800 with second visual representation 1401b. Such geographic relationship for polygon 603, can in one embodiment, be stored in attribute data 402 as an attribute of polygon 603.

FIG. 18 illustrates attribute map 800 related to the location of mineral formation 1801. Another example of a landmark type is a mineral formation. Server application 304 can determine the geographic relationship, overlap or non-overlap, between polygon 603 and mineral formation 1801. Polygons 603 overlapping with mineral formation 1801 can be represented on attribute map 800 with first visual representation 1401a. Polygons 603 not overlapping with mineral formation 1801 can be represented on attribute map 800 with second visual representation 1401b.

FIG. 19 illustrates a portion of attribute table 402 related to polygon 603 comprising multiple owners. Sometimes, multiple entries exist for a particular attribute 701 of polygon 603. For example, polygon 603 may have more than one owner. Each owner can have a different percentage ownership. Further, each owner may separately lease his interest, or a single owner may lease a plurality of partial interests. Each lease can have separate provisions, creating different attributes 701 associated with polygon 603. To ensure the most important information gets shown on each map, server application 304 can make decisions. Turning to the data in FIG. 19, although tract 103.501.1 has a plurality of owners, for an attribute map focusing on ownership server application can prefer the owner with the greatest ownership. Regarding lease maps, server application 304 can prefer tracts having a Lessee who is a client of user. It is possible in situations with many owners, that a client-lessee may have leases with a plurality of owners. Each lease could potentially have different terms as shown in FIG. 19. Regarding attribute maps showing lease expirations, server application 304 can prefer earlier expiring leases. For example, on attribute map 800 displaying lease expirations, for tract 103.501.1, for Smith leases, server application 304 can use the expiration date for the Adams lease instead of the Anderson lease because it is an earlier expiration date. For attribute map 800 relating to offset provisions, server application 304 first can determine which provisions landmark 1701 occurring within the offset distance activates. Among the activated provisions, server application 304 can choose the one with the earliest expiration date. As an example, suppose landmark 1701 is 750 feet away. The only active offset provision that would be activated would be the offset provision related to the Anderson lease. As such, it would be the offset provision considered for attribute map 800. However, if landmark 1701 is 450 feet away, then both offset provisions are active, and proper offset provision could be chosen by shortest amount of days to cure offset. In the example just mentioned, the Adams lease would be represented on attribute map because it is active and has the shortest offset time period.

It is understood that there can be other applications that are stored in memory 302 and are executable by processor 301 as can be appreciated. Where any component discussed herein is implemented in the form of software, any one of a number of programming languages can be employed such as, for example, C, C++, C#, Objective C, Java, Java Script, Perl, PHP, Visual Basic, Python, Ruby, Delphi, Flash, or other programming languages.

A number of software components can be stored in memory 302 and can be executable by processor 301. In this respect, the term "executable" means a program file that is in a form that can ultimately be run by processor 301. Examples of executable programs can be, for example, a compiled program that can be translated into machine code in a format that can be loaded into a random access portion of memory 302 and run by processor 301, source code that can be expressed in proper format such as object code that is capable of being loaded into a random access portion of memory 302 and executed by processor 301, or source code that can be interpreted by another executable program to generate instructions in a random access portion of memory 302 to be executed by processor 301, etc. An executable program can be stored in any portion or component of memory 302 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory 302 is defined herein as including both volatile and nonvolatile memory and data storage components. Volatile components are those that do not retain data values upon loss of power. Nonvolatile components are those that retain data upon a loss of power. Thus, memory 302 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, processor 301 can represent multiple processor 301S and memory 302 can represent multiple memories that operate in parallel processing circuits, respectively. In such a case, local interface 303 can be an appropriate network, including network 103 that facilitates communication between any two of the multiple processor 301S, between any processor 301S and any of the memories, or between any two of the memories, etc. Local interface 303 can comprise additional systems designed to coordinate this communication, including, for example, performing load balancing. processor 301 can be of electrical or of some other available construction.

Although server application 304, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein."

What is claimed is:

1. A method for making a map comprising
storing in a map file within a data store, shape files each representative of a tract of land, said shape files together defining a geographic region, said shape files each comprising a unique tract code, one or more of said shape files further comprising a location attribute and an offset provision in attribute data, said location attribute defining the location of said tract of land within said geographic region;
storing in said data store, landmark data related to a landmark at least partially within said geographic region;
determining whether each of said location attributes has a geographic relationship with said landmark data, said geographic relationship a proximity of said tract of land to said landmark within a distance related to said offset provision;
displaying on a map of said geographic region, shape files comprising said location attribute having said geographic relationship, with a first visual representation, and said shape files comprising said location attribute not having said geographic relationship, with a second visual representation, said map viewable on a computer screen, said first visual representation representing for each of said shape files displayed with said first visual representation that said offset provision of said shape file has been activated.

2. The method of claim 1 wherein said offset provision comprises a time period to cure the activation of said offset provision.

3. The method of claim 1 wherein said landmark is a hydrocarbon formation.

4. A system for making a map comprising
a memory comprising an application and a database;
a processor that, according to instructions of said application
stores in a data store, shape files each representative of a tract of land, said shape files together defining a geographic region, said shape files each comprising a unique tract code, one or more of said shape files further comprising a location attribute and an offset provision in attribute data, said location attribute defining the location of said tract of land within said geographic region;
stores in said data store landmark data related to a landmark at least partially within said geographic region;
determines whether each of said location attributes within said one or more of said shape files has a geographic relationship with said landmark, said geographic relationship a proximity of said shape file to said landmark within a distance related to said offset provision;
displays on a map of said geographic region, shape files comprising said location attribute having said geographic relationship, with a first visual representation, and said shape files comprising said location attribute not having said geographic relationship, with a second visual representation, said map viewable on a computer screen, said first visual representation representing for each of said shape files displayed with said first visual representation that said offset provision of said shape file has been activated.

5. The system of claim 4 wherein said offset provision comprises a time period to cure the activation of said offset provision.

6. The system of claim 4 wherein said landmark is a hydrocarbon formation.

7. A non-transitory computer-readable storage medium comprising a computer readable program code embodied therein, wherein the computer readable program code is adapted to be executed to implement the method of claim 1.

* * * * *